(12) United States Patent
Lee (10) Patent No.: US 12,479,529 B2
(45) Date of Patent: Nov. 25, 2025

(54) VEHICLE BODY PRODUCTION SYSTEM AND METHOD THEREOF

(71) Applicants: HYUNDAI MOTOR COMPANY, Seoul (KR); KIA CORPORATION, Seoul (KR)

(72) Inventor: Seung Ho Lee, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 459 days.

(21) Appl. No.: 17/983,700

(22) Filed: Nov. 9, 2022

(65) Prior Publication Data

US 2023/0294780 A1 Sep. 21, 2023

(30) Foreign Application Priority Data

Mar. 17, 2022 (KR) .................. 10-2022-0033546

(51) Int. Cl.
*G05B 19/4155* (2006.01)
*B25J 9/00* (2006.01)
*B62D 65/02* (2006.01)

(52) U.S. Cl.
CPC .......... *B62D 65/022* (2013.01); *B25J 9/0093* (2013.01); *B62D 65/026* (2013.01); *G05B 19/4155* (2013.01); *G05B 2219/45135* (2013.01)

(58) Field of Classification Search
CPC .................. B62D 65/022; G05B 19/4155
USPC ....................................... 700/212
See application file for complete search history.

(56) References Cited

U.S. PATENT DOCUMENTS

| | | | |
|---|---|---|---|
| 6,421,893 B1* | 7/2002 | Katayama | B62D 65/06 29/796 |
| 9,669,502 B2 | 6/2017 | Hesse et al. | |
| 9,884,420 B2 | 2/2018 | Minkebige et al. | |
| 2012/0110838 A1* | 5/2012 | Kang | B61B 13/127 29/824 |
| 2013/0145616 A1* | 6/2013 | Jang | B62D 65/18 29/822 |
| 2019/0185085 A1* | 6/2019 | Toeniskoetter | B62D 65/022 |

FOREIGN PATENT DOCUMENTS

| | | |
|---|---|---|
| EP | 2149422 B1 | 10/2015 |
| KR | 2011-0124411 A | 11/2011 |
| KR | 10-1509922 B1 | 4/2015 |

(Continued)

*Primary Examiner* — Jigneshkumar C Patel
(74) *Attorney, Agent, or Firm* — MCDONNELL BOEHNEN HULBERT & BERGHOFF LLP (57) ABSTRACT

A vehicle body production system includes a plurality of turntables including a plurality of jigs disposed therein and configured to weld and assemble a panel, a supply robot configured to grip the panel and supply the panel to the turntable, an assembly robot provided beside the turntable and configured to weld and assemble the panel supplied to the turntable, a take-out robot configured to take out the welded and assembled panel, and a control unit configured to control the supply robot to grip a plurality of panels and supply the plurality of panels to the turntable depending on a vehicle type, to control the assembly robot to sequentially weld and assemble the supplied panels while rotating the turntable depending on the vehicle type, and to control the take-out robot to take out the welded and assembled panels.

14 Claims, 10 Drawing Sheets

(56) References Cited

FOREIGN PATENT DOCUMENTS

| KR | 10-1526687 B1 | 6/2015 |
|----|---------------|--------|
| KR | 10-1724490 B1 | 4/2017 |
| KR | 2017-0115440 A | 10/2017 |
| WO | 2019/047324 A1 | 3/2019 |
| WO | 2020/107706 A1 | 6/2020 |

* cited by examiner

VEHICLE BODY PRODUCTION SYSTEM AND METHOD THEREOF

CROSS REFERENCE TO RELATED APPLICATIONS

This application claims priority from Korean Patent Application No. 10-2022-0033546, filed on Mar. 17, 2022, in the Korean Intellectual Property Office, the disclosure of which is incorporated herein by reference in its entirety.

BACKGROUND

1. Field

The present disclosure relates to a vehicle body production system and a method thereof, and more particularly to a vehicle body production system and a method thereof, configured to install a plurality of turntables corresponding to the number of vehicle types to be produced and the production quantities thereof so as to obtain a flexible multiple-vehicle production method, thereby reducing facility maintenance and management costs, reducing the number of points of failure, and performing continuous production without interruption of operation of a production line in the event of a facility failure such that the response to the failure and production are simultaneously performed, thereby improving ease of maintenance and simplifying facilities without requiring a bogie-changing device.

2. Description of the Related Art

In general, a vehicle body assembly process is broadly formed of production processes of a floor line, a side line, a roof line, and a body build line. When any one of the production processes of the floor line, the side line, the roof line, and the body build line is stopped due to a facility failure, vehicle body production may not be continuously performed.

Currently, in order to solve the above-mentioned problem in which the vehicle body production is not continuously performed due to the facility failure, a buffer facility is additionally provided between the production processes of the floor line, the side line, the roof line, and the body build line, thereby preventing the whole process from being interrupted when a facility failure occurs in one line.

However, additionally providing the buffer facility therebetween in order to prevent the whole process from being interrupted incurs excessive facility investment costs.

Recently, in order to improve the productivity of the vehicle body assembly process and to reduce production facility investment costs, proposed is a method of enabling the response to the failure and production to be performed simultaneously without interruption of operation of a production line in the event of a production facility failure.

The information disclosed in this Background section is only for enhancement of understanding of the general background of the disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide a vehicle body production system and a method thereof, configured to install a plurality of turntables depending on the number of vehicle types to be produced and the production quantities thereof so as to realize a flexible multiple-vehicle production method, thereby reducing facility maintenance and management costs, reducing the number of points of failure, and performing continuous production without interruption of operation of a production line in the event of a facility failure such that the response to the failure and production are simultaneously performed, thereby improving ease of maintenance and simplifying facilities without requiring a bogie-changing device.

In accordance with an aspect of the present disclosure, the above and other objects can be accomplished by a vehicle body production system including a plurality of turntables including a plurality of jigs disposed therein and configured to weld and assemble a panel, a supply robot configured to grip the panel and supply the panel to the turntable, an assembly robot provided beside the turntable and configured to weld and assemble the panel supplied to the turntable, a take-out robot configured to take out the welded and assembled panel, and a control unit configured to perform a control operation to allow the supply robot to grip a plurality of panels and supply the plurality of panels to the turntable depending on a vehicle type, to perform a control operation to allow the assembly robot to sequentially weld and assemble the supplied panels while rotating the turntable depending on the vehicle type, and to perform a control operation to allow the take-out robot to take out the welded and assembled panels.

A plurality of the supply robots may be provided beside the plurality of turntables, and each of the supply robots may move beside the plurality of turntables to selectively supply the panel to a corresponding one of the plurality of turntables.

The control unit may perform a control operation to allow the supply robot to grip the panel and supply the panel to a normally operating turntable when some of the plurality of turntables are broken down.

The control unit may perform a control operation to allow the assembly robot and the take-out robot corresponding to the normally operating turntable to assemble the panel in the normally operating turntable when some of the plurality of turntables are broken down.

The supply robot may simultaneously grip the plurality of panels and supply the same to the turntable.

The supply robot may be formed of a housing unit configured to grip a rear of the panel and a flange unit configured to grip a front of the panel, and the supply robot may support the panel from beneath while gripping the panel using the housing unit and flange unit.

The housing unit may grip the rear of the panel by moving a chuck clamp in a y-direction, and the flange unit may grip the front of the panel by moving a multiplex pin in the y-direction and a z-direction.

The vehicle body production system may further include a position alignment unit including a rotation unit and a circle unit configured to rotate depending on the vehicle type, the position alignment unit supporting the panel from beneath using the rotation unit and the circle unit and aligning a position of the panel so that the supply robot grips the panel.

The rotation unit may form a plurality of protruding shapes protruding outwards and may be rotated by a servo motor.

Each of the position alignment units may be provided at opposite sides of a front side and a rear side to respectively support the front and the rear of the panel from beneath using the rotation unit.

The circle unit may align the position of the panel in a y-direction and a z-direction with respect to the panel.

In accordance with another aspect of the present disclosure, there is provided a method of producing a vehicle body, the method including determining whether each of a plurality of turntables are broken down, determining whether each of the broken-down turntables remains in a broken-down state for a predetermined time upon determining that some of the plurality of turntables are broken down, and controlling each of the broken-down turntables to execute a failure mode and controlling the supply robot to supply panels to the normally operating turntables upon determining that the broken-down state is maintained for a predetermined time.

The failure mode may be configured to deactivate a production abnormality signal of the broken-down turntable and to press a stop button.

The method may further include temporarily stopping operation of the broken-down turntables upon determining that the broken-down turntables do not remain in the broken-down state for a predetermined time.

The method may further include welding and assembling the panels supplied to the normally operating turntables and taking measures to respond to failure of the broken-down turntables after controlling the broken-down turntables to execute the failure mode and controlling the supply robot to supply the panels to the normally operating turntables.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Specific structural or functional descriptions made in connection with the embodiments of the present disclosure disclosed in the specification or the application are merely illustrative for the purpose of describing embodiments according to the present disclosure. Further, the present disclosure may be implemented in various forms, and should not be construed as being limited to the embodiments described in the specification or the application.

Since the embodiments according to the present disclosure may be variously modified and may have various forms, specific embodiments are illustrated in the drawings and described in detail in the specification or the application. However, it should be understood that the embodiments according to the concept of the present disclosure are not intended to be limited to the specific disclosed forms, and include all modifications, equivalents, and substitutes that fall within the spirit and technical scope of the present disclosure.

Unless otherwise defined, all terms used herein, including technical and scientific terms, have the same meanings as commonly understood by those skilled in the art to which the present disclosure pertains. Terms such as those defined in commonly used dictionaries should be interpreted as having meanings consistent with their meanings in the context of the related technology. Further, unless explicitly defined in this specification, the terms should not be interpreted in an ideal or overly formal sense.

Hereinafter, the present disclosure will be described in detail by describing preferred embodiments thereof with reference to the accompanying drawings. The same reference numerals in each drawing represent the same members.

Figure 1:
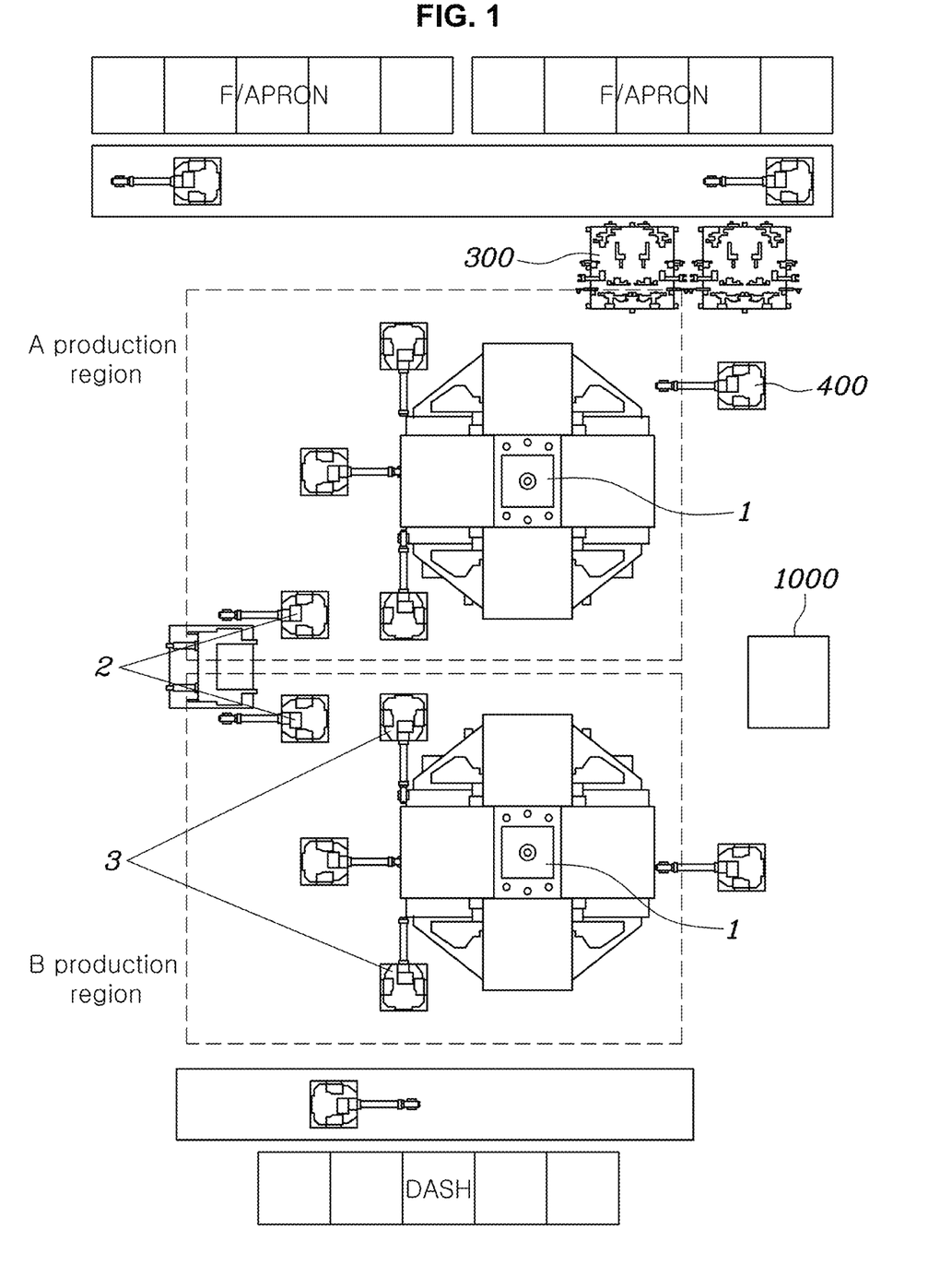
FIG. 1 is a view showing a vehicle body production system according to an embodiment of the present disclosure.
Figure 2:
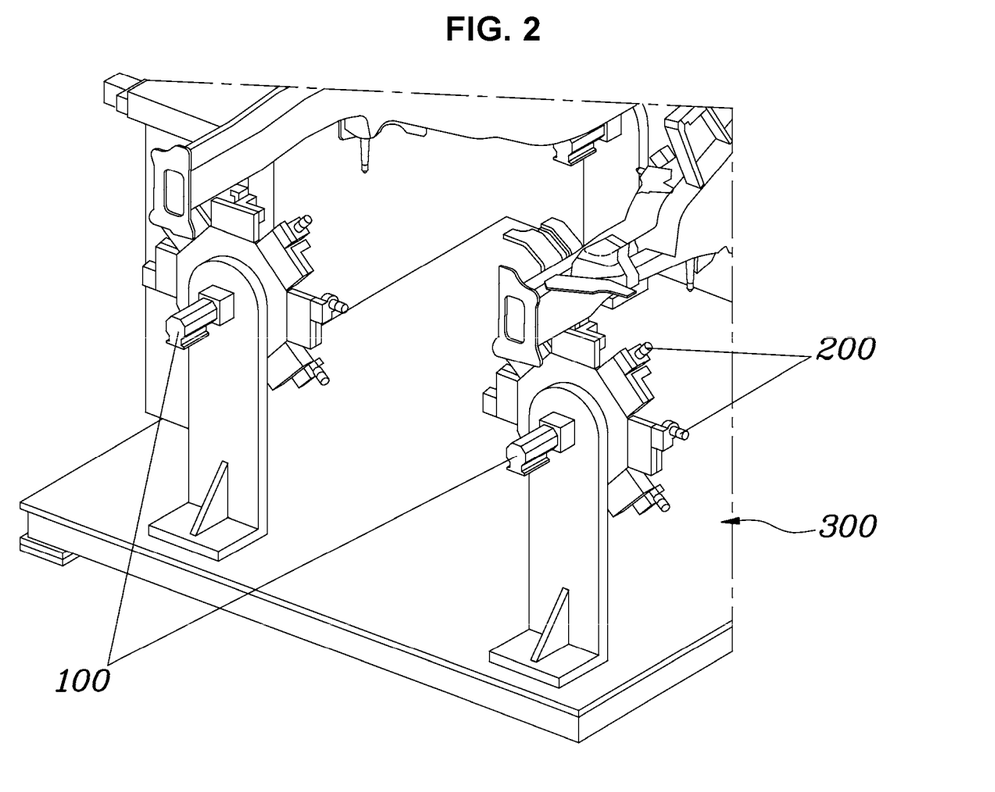
FIG. 2 is a side view of a position alignment unit according to the embodiment of the present disclosure.
Figure 3:
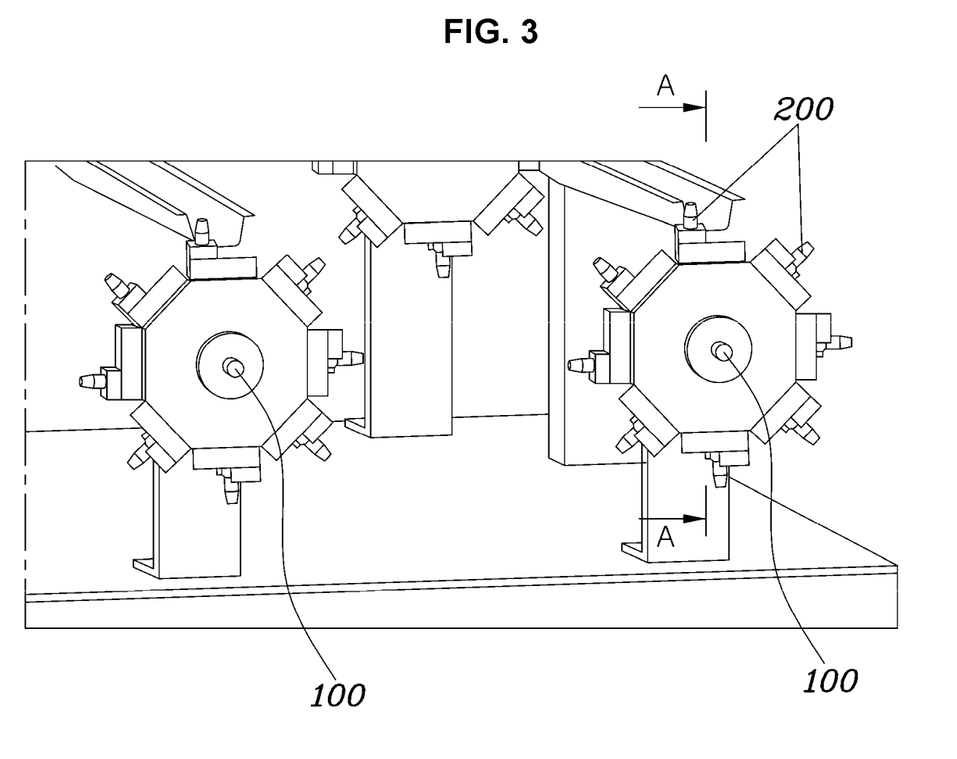
FIG. 3 is a front view of the position alignment unit.
Figure 4:
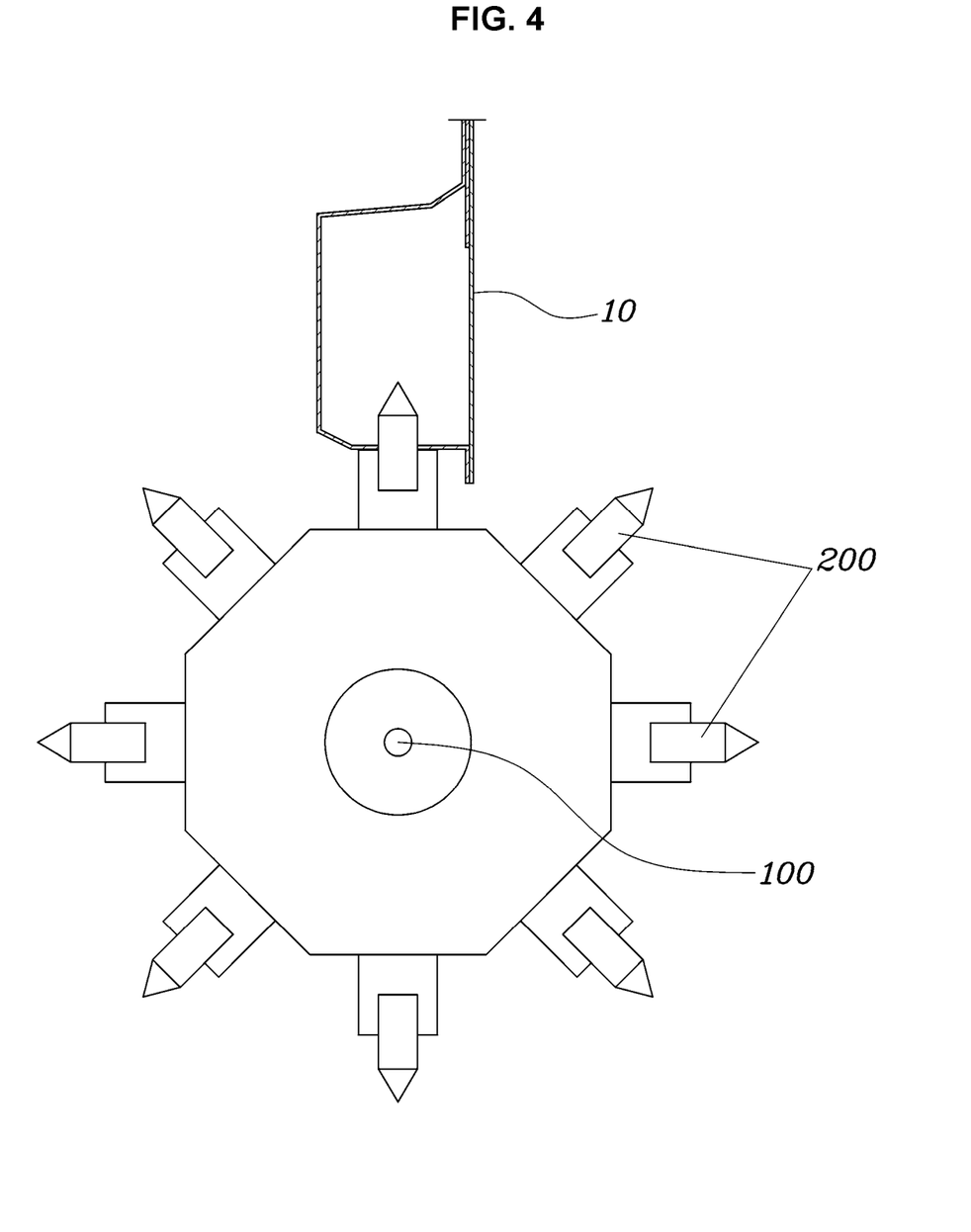
FIG. 4 is a view showing a rotation unit and a servo motor forming the position alignment unit.
Figure 5:
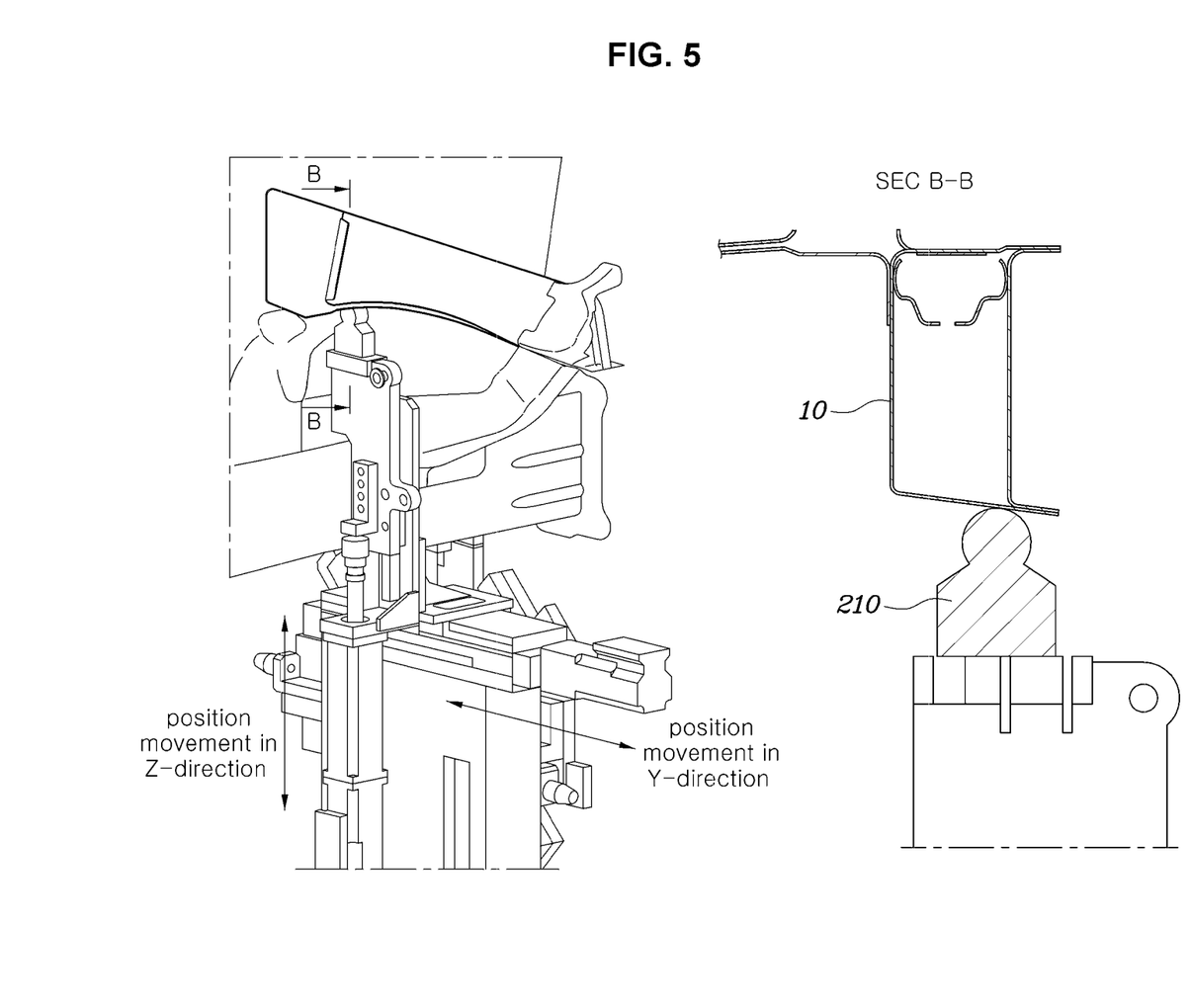
FIG. 5 is a view showing that a circle unit, forming the position alignment unit, changes in position to support a panel.
Figure 6:
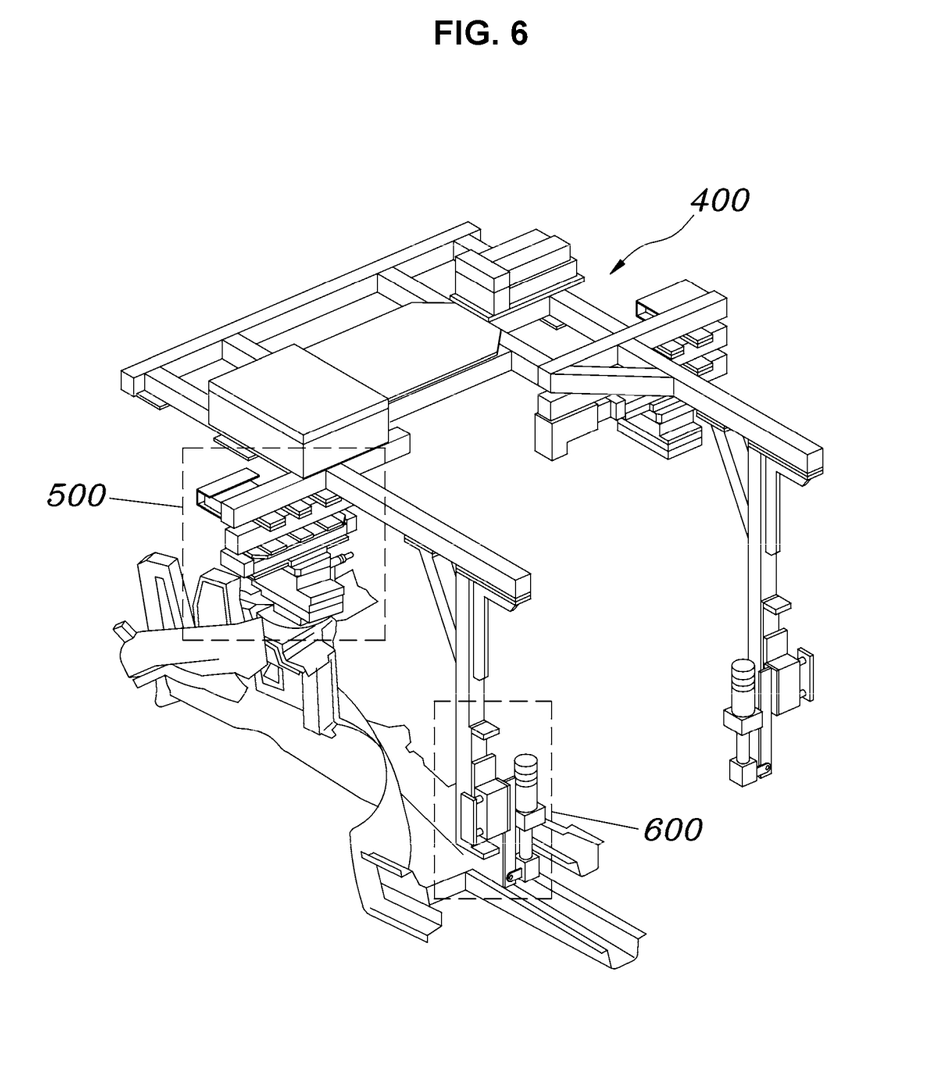
FIG. 6 is a view showing a shape of a supply robot including a housing unit and a flange unit.
Figure 7:
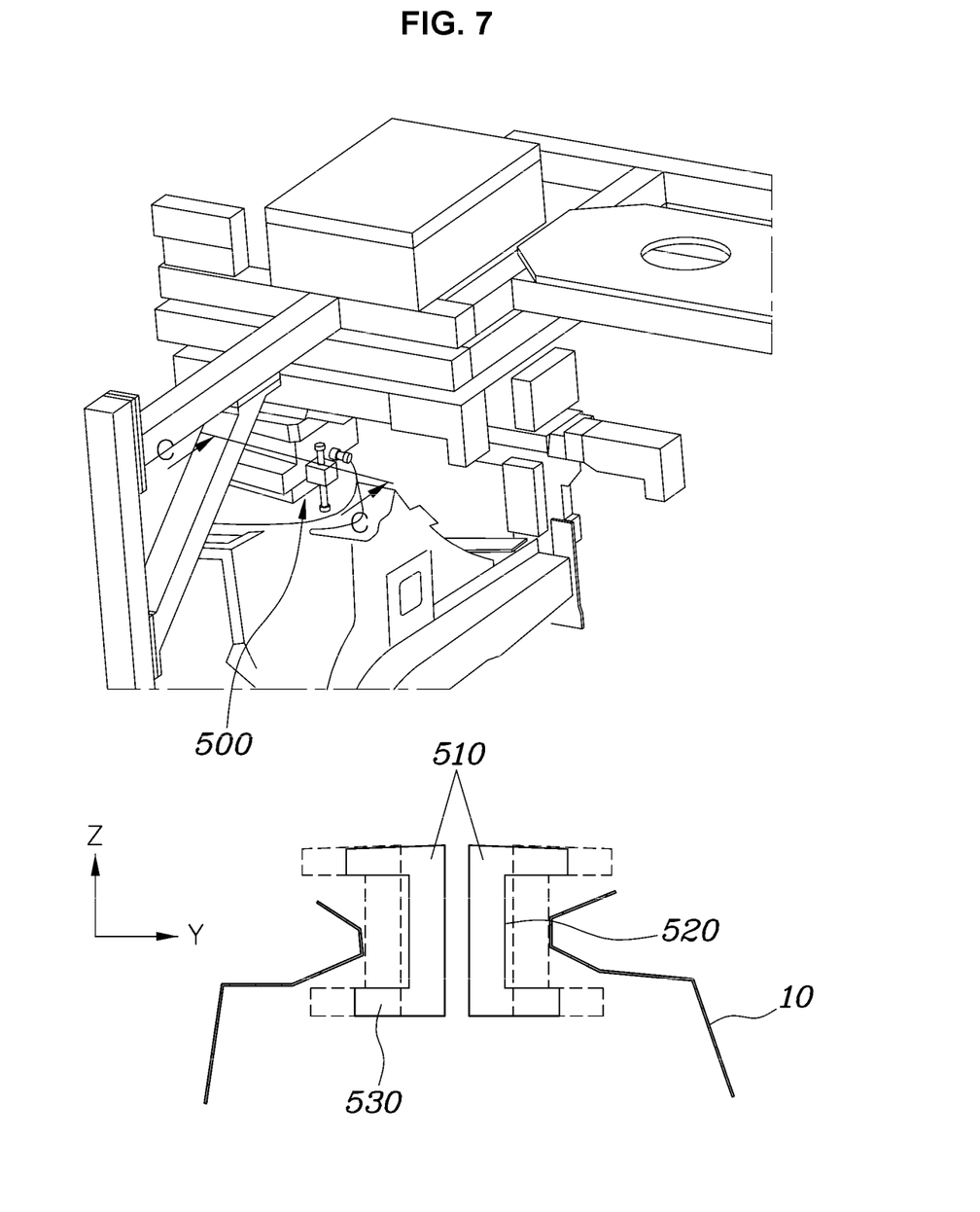
FIGS. 7 and 8 are views showing a gripping method of the housing unit and the flange unit according to FIG. 6.
Figure 8:
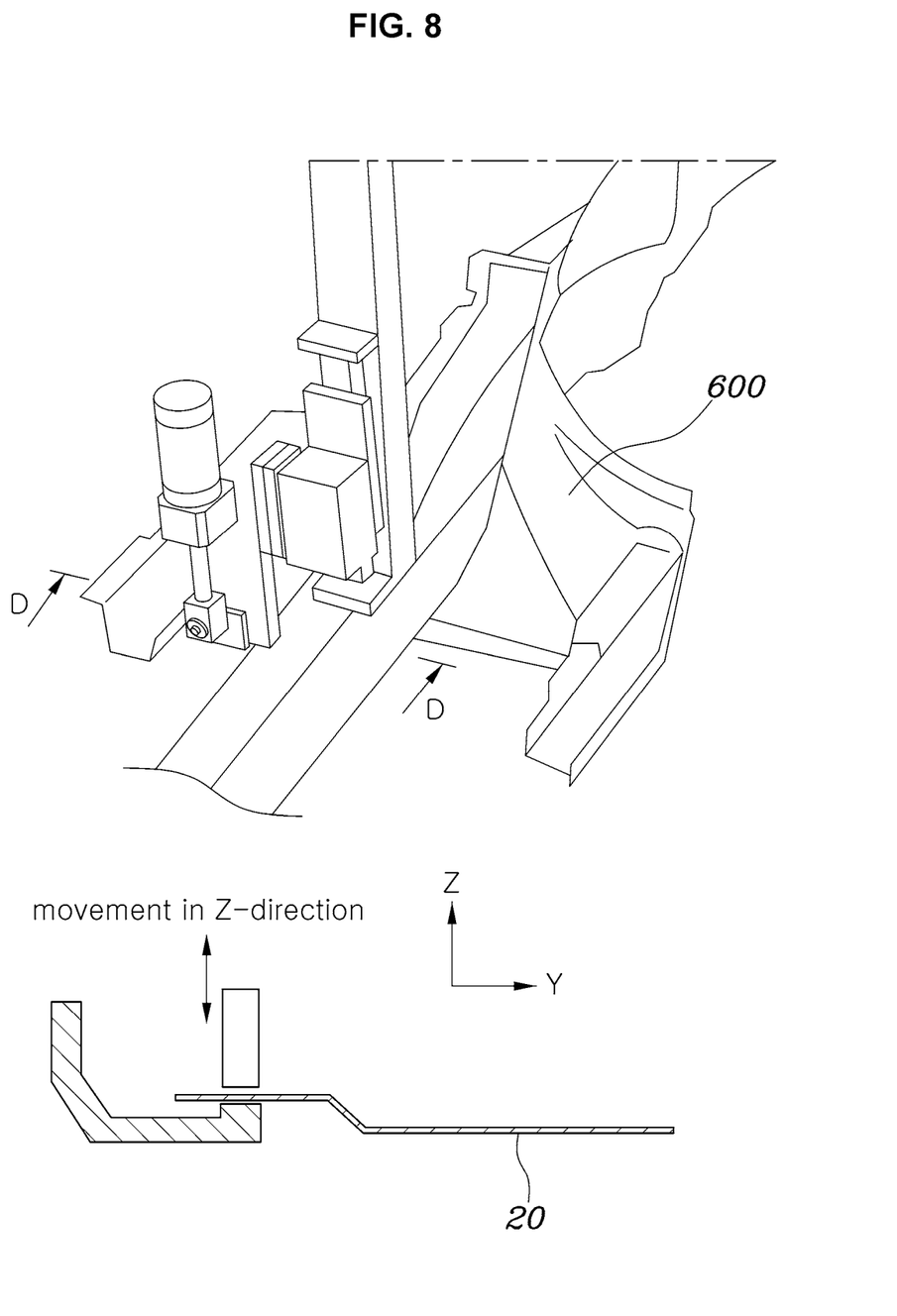
Figure 9:
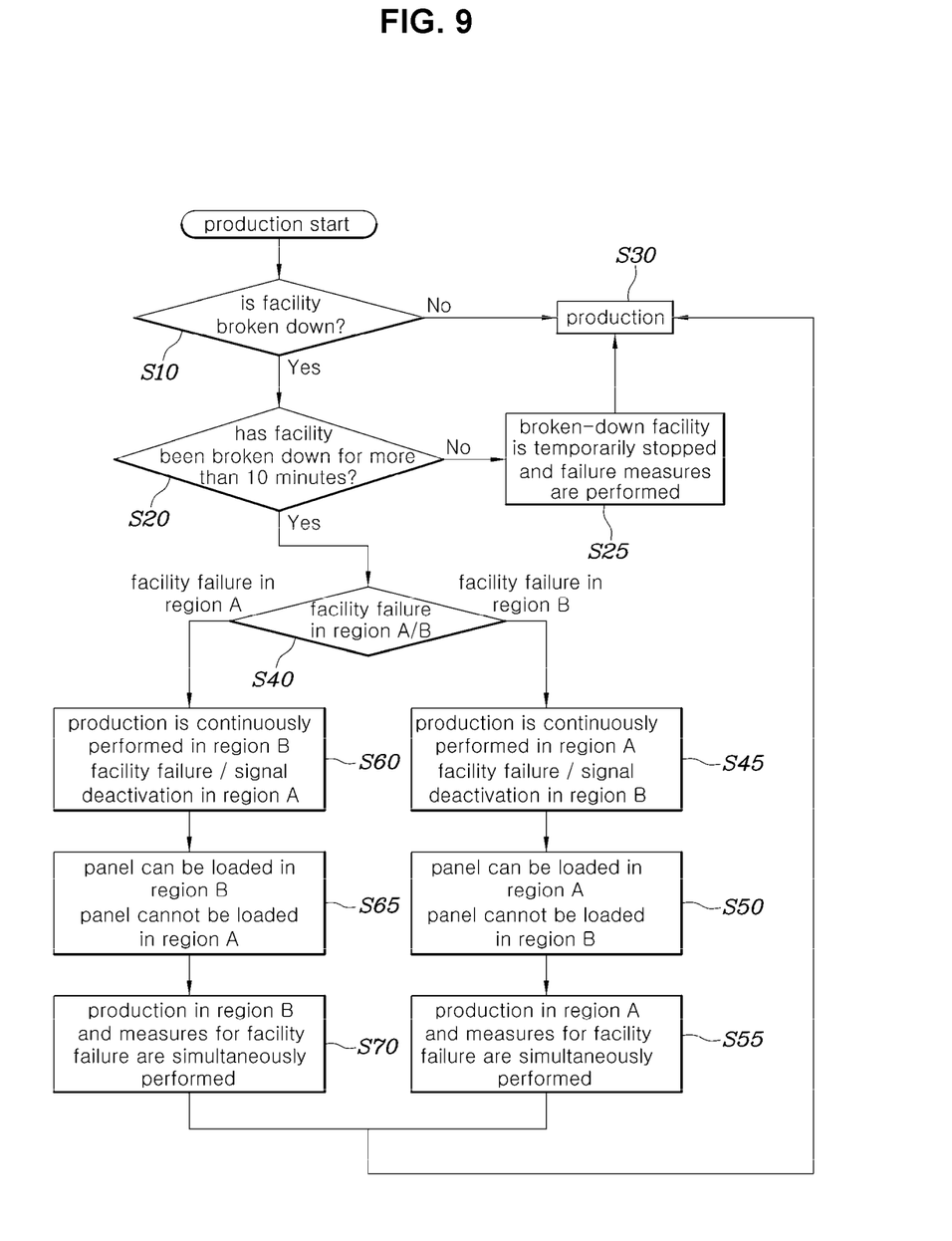
FIG. 9 is a flowchart showing operation of the vehicle body production system according to FIG. 1.
Figure 10:
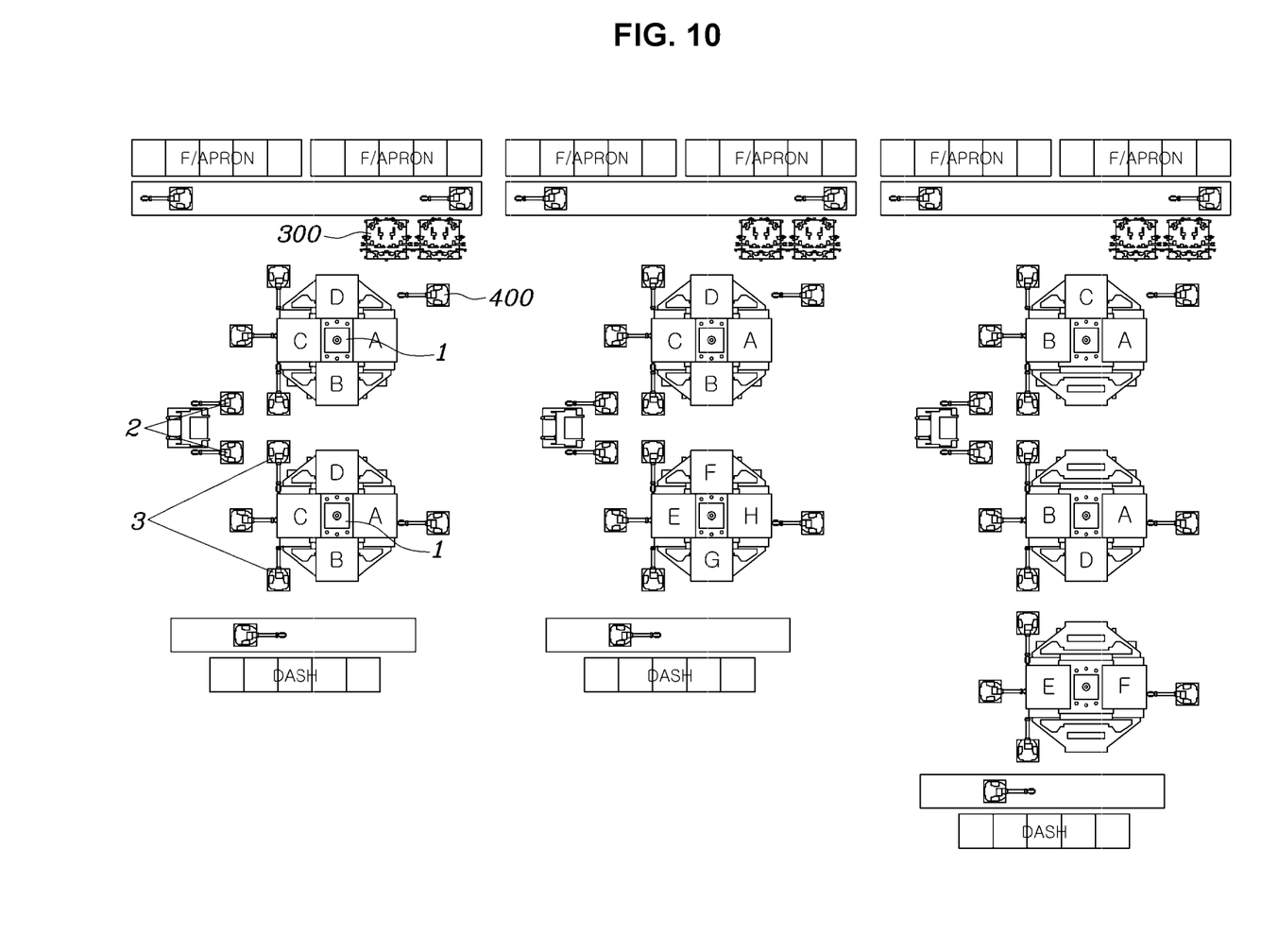
FIG. 10 is a view showing the vehicle body production system in which an expanded layout is formed depending on the number of vehicle types to be produced and production quantities.

FIG. 1 is a view showing a vehicle body production system according to an embodiment of the present disclosure. FIG. 2 is a side view of a position alignment unit according to the embodiment of the present disclosure. FIG. 3 is a front view of the position alignment unit. FIG. 4 is a view showing a rotation unit and a servo motor forming the position alignment unit. FIG. 5 is a view showing that a circle unit, forming the position alignment unit, changes in position to support a panel. FIG. 6 is a view showing a shape of a supply robot including a housing unit and a flange unit. FIGS. 7 and 8 are views showing a gripping method of the housing unit and the flange unit according to FIG. 6. FIG. 9 is a flowchart showing operation of the vehicle body production system according to FIG. 1. FIG. 10 is a view showing the vehicle body production system in which an expanded layout is formed depending on the number of vehicle types to be produced and production quantities.

FIG. 1 is a view showing a vehicle body production system according to an embodiment of the present disclosure. Referring to FIG. 1, the vehicle body production system according to the embodiment of the present disclosure includes a plurality of turntables 1 including a plurality of jigs disposed therein and configured to weld and assemble a panel, a supply robot 400 configured to grip the panel and supply the same to the turntable 1, an assembly robot 3 provided beside the turntable 1 and configured to weld and assemble the panel supplied to the turntable 1, a take-out robot 2 configured to take out the welded and assembled panel, and a control unit 1000 configured to perform a control operation to allow the supply robot 400 to grip a plurality of panels corresponding to a vehicle type and supply the same to the turntable 1, to perform a control operation to allow the assembly robot 3 to sequentially weld and assemble the supplied panels while rotating the turntable 1 depending on the vehicle type, and to perform a control operation to allow the take-out robot 2 to take out the welded and assembled panels.

The vehicle body production system according to the present disclosure is characterized in that a plurality of turntables 1 are installed corresponding to the number of vehicle types to be produced and production quantities thereof, thereby obtaining a flexible multiple-vehicle production method. In this manner, it is possible to construct a non-stop production system and to reliably produce various types of vehicles. A vehicle body assembly process is broadly formed of production processes of a floor line, a side line, a roof line, and a body build line. When any one of the production processes of the floor line, the side line, the roof line, and the body build line is stopped due to a facility failure, the whole process of vehicle body production may be interrupted. In order to prevent interruption of the whole process thereof, a buffer facility, which is a facility that allows components to be made and loaded in advance, is additionally provided between the production processes of the floor line, the side line, the roof line, and the body build line, thereby preventing the whole process from being interrupted when a facility failure occurs in one line. However, additionally providing the buffer facility therebetween in order to prevent the whole process from being interrupted incurs excessive facility investment costs.

A front floor panel production system of the related art uses a method of combining a linear cell and the turntable 1, and a multiple-vehicle production system using the linear cell and a linear bogie, the linear bogie being used as a welding jig for each vehicle type.

The linear cell may be a flexible production system capable of producing various types of vehicles by moving the linear bogie using a linear motor and replacing the same, and may generally be capable of producing about 68 units per hour. In addition, application of a linear cell method of the related art has many factors causing facility failure, which leads to high facility maintenance and management costs.

For example, when the linear bogie is transported, it is difficult to set the frequency of the linear motor to control the bogie transportation speed. Further, a shock absorber configured to reduce the speed thereof may break down and many facility failures may be attributable to a power supply device and an air supply device provided in the linear bogie.

Accordingly, in order to solve the problems of the floor panel production system of the related art, the present disclosure provides a flexible multiple-vehicle production method using a combination of a plurality of turntables 1 and a robot. In the case of the flexible multiple-vehicle production method using the combination of the plurality of turntables 1 and the robot, as shown in FIG. 10, the number of turntables 1 may be adjusted depending on the number of vehicle types to be produced and the production quantities thereof. Further, in the case of production in a fixed manner, productivity is improved compared to a production system of the related art.

Each of the drawings in FIG. 10 shows, from the left, a production system for four main vehicle types, a production system for eight non-main vehicle types, and a production system for two main vehicle types and four non-main vehicle types.

Specifically, compared to a technology of the related art capable of producing one unit, the present disclosure is capable of producing two units because it is possible to simultaneously perform production in an A-region and a B-region. Additionally, even if the external environment changes, such as when changing the main production vehicle type or adding a new vehicle type, it is possible to flexibly change production conditions. While the production system of the related art produces about 68 units per hour, the present disclosure may produce about 85 units per hour.

Specifically, a plurality of turntables 1 include a plurality of jigs disposed therein and configured to weld and assemble a panel. A plurality of turntables 1 may be provided corresponding to the number of main vehicle types or non-main vehicle types, but are not limited to two turntables. The plurality of turntables 1 include the assembly robot 3 provided at the side thereof and configured to weld and assemble the panel supplied to the turntable 1.

In the present disclosure, four jigs are provided on the plurality of turntables 1, and the panel is supplied to the upper portions of the jigs using the supply robot 400. Here, the number of jigs is not limited to four jigs, and may vary depending on the vehicle type. In addition, when the panel is welded and assembled by the assembly robot 3, the take-out robot 2 takes out the welded and assembled panel, thereby completing assembly of the vehicle body using the panel.

First, a plurality of supply robots 400 may be provided at the sides of the plurality of turntables 1, and each of the supply robots 400 may move at the side of the turntable 1 to selectively supply the panel to the plurality of turntables 1.

Referring to FIG. 1, the supply robot 400 may freely move in the direction in which the turntable 1 is located at the side of each turntable 1. Since the supply robot 400 located at the side of the turntable 1 is not fixed to the corresponding turntable 1, the same may supply a panel to another turntable 1.

The supply robot 400 will be described below in detail. When some of the plurality of turntables 1 break down, the control unit 1000 may perform a control operation to allow the supply robot 400 to grip a panel and supply the same to the turntable 1 that is not broken down. In the production system of the related art, when some turntables 1 among the plurality of turntables 1 break down, the whole process is stopped and a subsequent process is also stopped, and as such, the production process is interrupted. In order to solve the above-mentioned problem, the supply robot 400 is configured to supply the panel to the turntable 1 that is not broken down. Therefore, continuous production may be performed without interruption of the production line even in the event of a facility failure, thereby improving ease of maintenance by allowing the response to the failure and production to be performed simultaneously.

In addition, in the case of the assembly robot 3 and the take-out robot 2, when some of the plurality of turntables 1 break down, the control unit 1000 may control the assembly robot 3 and the take-out robot 2 corresponding to the turntable 1 that is not broken down so that the panel is assembled in the turntable 1 that is not broken down. Since the supply robot 400 is not fixed adjacent to the turntable 1, the control unit 1000 may perform the control operation to allow the supply robot 400 to grip the panel and supply the same to the turntable 1 that is not broken down. Meanwhile, since the assembly robot 3 and the take-out robot 2 are fixed to each turntable 1, the control unit 1000 is required to control the assembly robot 3 and the take-out robot 2 corresponding to the turntable 1 that is not broken down.

Further, the supply robot 400 may simultaneously grip a plurality of panels and supply the same to the turntable 1. The supply robot 400 may simultaneously grip the left and right panels of the fender apron 10 to supply the same to the jig, thereby remarkably shortening the production time of the vehicle body.

Referring to FIGS. 6 to 8, the supply robot 400 simultaneously grips the left and right panels of the fender apron 10 and supplies the same to the jig using a housing unit 500 and a flange unit 600. The supply robot 400 is formed of the housing unit 500, configured to grip the rear of the panel, and the flange unit 600, configured to grip the front of the panel. Further, the supply robot 400 may support the panel from beneath while gripping the panel using the housing unit 500 and the flange unit 600. A shock housing of the panel and the left and right four sides of a flange portion of the fender apron 10 are simultaneously gripped and supported from beneath by the housing unit 500 and the flange unit 600. Accordingly, when the robot moves after gripping the panel, it is possible to transport the panel without shaking.

More specifically, the housing unit 500 may move a chuck clamp 510 in the y-direction to grip the rear of the panel, and the flange unit 600 may move a multiplex pin 30 in the y-direction and the z-direction to grip the front of the panel. The housing unit 500 may grip the panel of the fender apron 10 in the y-direction using the chuck clamp 510 in a common hole 530 of the shock housing, and may restrict the panel from moving in the z-direction by gripping the same in the y-direction. The movement of the chuck clamp 510 in the y-direction may be performed in the common hole 530 of various shock housings using an electric cylinder, and force may be applied to a force action point 520 to fix the panel of the fender apron 10.

Further, the flange unit 600 may grip a fender apron flange 20 using the multiplex pin 30 of a flange common portion of the fender apron 10, and may grip the fender apron flange 20 in the y-direction and the z-direction, thereby regulating the movement of the fender apron flange 20 in the z-direction and the y-direction, respectively. The movement in the y-direction and the z-direction using the multiplex pin 30 makes it possible to grip the fender apron flange 20 of the multiple-vehicle panel using an air cylinder or an electric cylinder.

In addition, FIGS. 2 and 3 are views showing a position alignment unit 300 according to the embodiment of the present disclosure. Specifically, the vehicle body production system may further include the position alignment unit 300 including a rotation unit 200 and a circle unit 210 configured to rotate depending on the vehicle type, the position alignment unit 300 supporting the panel from beneath using the rotation unit 200 and the circle unit 210 and aligning a position of the panel so that the supply robot 400 grips the panel. The position alignment unit 300 is a jig configured to correct changes in the position of the panels loaded on a pallet, and may be applied to a multiple-vehicle production method. The position alignment unit 300 may align the panel at the same position as the position shown in the drawing so that the supply robot 400 simultaneously grips the left and right panels of the fender apron 10. In addition, the rotation unit 200 and the circle unit 210 may be provided to correspond to various vehicle types. The fender apron 10 moves in the y-direction and the z-direction from beneath and may be supported by the circle unit 210 from beneath. Therefore, the circle unit 210 aligns the position of the panel in the y-direction and the z-direction of the panel, thereby providing a simple facility configuration compared to the vehicle body production system of the related art. Accordingly, it is possible to improve ease of maintenance and to realize efficient production of various types of vehicles.

More specifically, the rotation unit 200 may form a plurality of protruding shapes protruding outwards, and may be rotated by a servo motor 100. As shown in FIGS. 4 and 5, the rotation units 200, corresponding to eight vehicle types, protrude outwards, and the rotation units 200 may be rotated by the servo motor 100. When the rotation unit 200 corresponds to eight vehicle types, the rotation unit 200 includes eight protrusions corresponding thereto, and the number of rotation units 200 may vary depending on the vehicle types. The servo motor 100 is operated to rotate the rotation unit 200 and to move the same in the correct order depending on the vehicle type, thereby making it possible to produce various types of vehicles.

Additionally, the position alignment units 300 may be respectively provided at opposing positions on a front side and a rear side to support the front and the rear of the panel from beneath using the rotation unit 200. In consideration of the long shape of the fender apron 10, the positioning unit 300 is provided on each of the front and rear sides to align the position of the panel so that the supply robot 400 grips the panel.

FIG. 9 is a flowchart showing operation of the vehicle body production system according to FIG. 1.

Referring to FIG. 9, a method of producing a vehicle body includes determining whether each of a plurality of turntables 1 is broken down in step S10, determining whether each of the broken-down turntables 1 remains in a broken-down state for a predetermined time upon determining that some of the plurality of turntables 1 are broken down in step S20, and controlling each of the broken-down turntables 1 to execute a failure mode and controlling each of the supply robot 400 to supply panels to the turntables 1 that are not broken down upon determining that the broken-down state is maintained for a predetermined time in step S40. In some embodiments, a predetermined time may be a long time, it may be the minimum time required for failure determination.

Since detailed technical characteristics in each step of the method of producing the vehicle body according to the present disclosure are the same as or similar to the technical characteristics of each configuration in the vehicle body production system according to the present disclosure described above, a detailed description thereof will be omitted.

The failure mode may be a mode in which a production abnormality signal of the broken-down turntable 1 is deactivated in steps S45 and S60 and a stop button is pressed.

The method of producing the vehicle body further includes temporarily stopping operation of the broken-down turntables 1 upon determining that the broken-down turntables 1 do not remain in the broken-down state for a predetermined time in step S25.

The method of producing the vehicle body further includes welding and assembling the panels supplied to the turntables 1 that are not broken down in steps S50 and S65 and taking measures to respond to failure of the broken-down turntables 1 in steps S55 and S70 after controlling the broken-down turntables 1 to execute the failure mode and controlling the supply robot 400 to supply the panels to the turntables 1 that are not broken down in step S40.

According to the vehicle body production system and the method thereof, a plurality of turntables are installed corresponding to the number of vehicle types to be produced and the production quantities thereof so as to obtain a flexible production method for various types of vehicles. In this manner, it is possible to reduce facility maintenance and management costs, to reduce the number of points of failure, and to perform continuous production without interruption of operation of a production line in the event of a facility failure such that the response to the failure and production are performed simultaneously, thereby improving ease of maintenance and simplifying facilities without requiring a bogie-changing device.

As is apparent from the above description, according to a vehicle body production system and a method thereof, it is possible to install a plurality of turntables corresponding to the number of vehicle types to be produced and the production quantities thereof so as to establish a flexible production method for various types of vehicles, thereby reducing facility maintenance and management costs, reducing the number of points of failure, and performing continuous production without interruption of operation of a production line in the event of a facility failure such that the response to the failure and production are simultaneously performed, thereby improving ease of maintenance and simplifying facilities without requiring a bogie-changing device.

The effects of the present disclosure are not limited to the above-mentioned effects, and other effects not mentioned will be clearly understood by those skilled in the art from the detailed description of the embodiments.

Although the preferred embodiments of the present disclosure have been disclosed for illustrative purposes, those skilled in the art will appreciate that various modifications, additions, and substitutions are possible, without departing from the scope and spirit of the disclosure as disclosed in the accompanying claims.

The invention claimed is:

1. A vehicle body production system comprising:
    a plurality of turntables comprising a plurality of jigs, and configured to weld and assemble a panel;
    a supply robot configured to grip the panel and supply the panel to the turntable;
    an assembly robot positioned beside the turntable and configured to weld and assemble the panel supplied to the turntable;
    a take-out robot configured to take out the welded and assembled panel; and
    a control unit configured to:
    control the supply robot to grip a plurality of panels and supply the plurality of panels to the turntable depending on a vehicle type;
    control the assembly robot to sequentially weld and assemble the supplied panels while rotating the turntable depending on the vehicle type;
    control the take-out robot to take out the welded and assembled panels; and
    control the supply robot to grip the panel and supply the panel to a normally operating turntable when at least one of the plurality of turntables is broken down.

2. The vehicle body production system according to claim 1, wherein a plurality of the supply robots are positioned beside the plurality of turntables, and each robot of the plurality of the supply robots moves beside the plurality of turntables to supply the panel to a corresponding one of the plurality of turntables.

3. The vehicle body production system according to claim 1, wherein the control unit controls the assembly robot and the take-out robot corresponding to the normally operating turntable to assemble the panel in the normally operating turntable when at least one of the plurality of turntables is broken down.

4. The vehicle body production system according to claim 1, wherein the supply robot simultaneously grips and supplies the plurality of panels to the turntable.

5. The vehicle body production system according to claim 1, wherein:
    the supply robot is formed of a housing unit configured to grip a rear of the panel and a flange unit configured to grip a front of the panel; and
    the supply robot supports the panel from beneath while gripping the panel using the housing unit and flange unit.

6. The vehicle body production system according to claim 5, wherein the housing unit grips the rear of the panel by moving a chuck clamp in a y-direction, and the flange unit grips the front of the panel by moving a multiplex pin in the y-direction and a z-direction.

7. The vehicle body production system according to claim 1, further comprising a position alignment unit comprising a rotation unit and a circle unit configured to rotate depending on the vehicle type, the position alignment unit supporting the panel from beneath using the rotation unit and the circle unit and aligning a position of the panel so that the supply robot grips the panel.

8. The vehicle body production system according to claim 7, wherein the rotation unit forms a plurality of protruding shapes protruding outwards, and is rotated by a servo motor.

9. The vehicle body production system according to claim 7, wherein the position alignment unit comprises a plurality of positioned alignment units, and wherein each of the position alignment units are provided at opposite sides of a front side and a rear side of the panel to support the front and the rear of the panel from beneath using the rotation unit.

10. The vehicle body production system according to claim 7, wherein the circle unit aligns the position of the panel in a y-direction and a z-direction with respect to the panel.

11. A method of producing a vehicle body, the method comprising:
    determining, by a control unit, which one of a plurality of turntables is broken down;
    determining that the determined broken down turntables remain in a broken-down state for a predetermined time upon determining that at least one of the plurality of turntables is broken down; and
    controlling each of the broken-down turntables to execute a failure mode and controlling a supply robot to supply panels to the normally operating turntables upon determining that the broken-down state is maintained for a predetermined time.

12. The method according to claim 11, wherein the failure mode is configured to deactivate a production abnormality signal of the broken-down turntable and to press a stop button.

13. The method according to claim 11, further comprising temporarily stopping operation of the broken-down turntables upon determining that the broken-down turntables do not remain in the broken-down state for the predetermined time.

14. The method according to claim 11, further comprising welding and assembling the panels supplied to the normally operating turntables and taking measures to respond to failure of the broken-down turntables after controlling the broken-down turntables to execute the failure mode and controlling the supply robot to supply the panels to the normally operating turntables.

* * * * *